US008893622B2

(12) United States Patent
Jackson et al.

(10) Patent No.: US 8,893,622 B2
(45) Date of Patent: Nov. 25, 2014

(54) TABLET-BREAKING INITIATOR FOR AIRBAG INFLATOR (75) Inventors: Scott Jackson, Centerville, UT (US); Andrew P. Jackson, Plain City, UT (US); Alan R. Larsen, Layton, UT (US)

(73) Assignee: Autoliv ASP, Inc., Ogden, UT (US)

( * ) Notice: Subject to any disclaimer, the term of this patent is extended or adjusted under 35 U.S.C. 154(b) by 392 days.

(21) Appl. No.: 13/034,287

(22) Filed: Feb. 24, 2011

(65) Prior Publication Data

US 2012/0217728 A1 Aug. 30, 2012

(51) Int. Cl.
*B60R 21/26* (2011.01)
*B60R 21/264* (2006.01)

(52) U.S. Cl.
CPC ... *B60R 21/2644* (2013.01); *B60R 2021/26029* (2013.01)
USPC ............. 102/530; 280/737; 280/741

(58) Field of Classification Search
USPC ............. 102/530; 280/736, 737, 741
See application file for complete search history.

(56) References Cited

U.S. PATENT DOCUMENTS

| RE18,837 | E | * | 5/1933 | Rolland ............... 102/202.11 |
|---|---|---|---|---|
| 4,316,874 | A | * | 2/1982 | Kasama et al. ............ 422/126 |
| 5,005,486 | A | | 4/1991 | Lenzen |
| 5,803,492 | A | * | 9/1998 | Rink et al. ............... 280/737 |
| 7,134,689 | B2 | | 11/2006 | Matsuda et al. |
| 7,607,688 | B2 | | 10/2009 | Kato et al. |
| 2005/0189753 | A1 | | 9/2005 | Kato et al. |
| 2009/0179408 | A1 | | 7/2009 | Brisighella, Jr. et al. |
| 2012/0037030 | A1 | * | 2/2012 | Tasaki et al. ............ 102/530 |

* cited by examiner

*Primary Examiner* — Daniel J Troy
(74) *Attorney, Agent, or Firm* — Madson IP, P.C.

(57) ABSTRACT

An igniter for a passenger vehicle safety airbag module includes a housing with apertured walls, gas-generating tablets filling the housing, and, in direct contact with gas-generating tablets, an initiator containing combustible material. A plurality of four malleable flaps of substantially identical shape and size are secured about the squib in an upstanding circumscribing array with spaced-apart, opposed lateral edges between adjacent of the flaps interconnected by fluid seals in the form of webbing that is structurally less robust than the flaps. The ends of the flaps remote from the squib curl radially inwardly into a spaced-apart edge-to-edge disposition beyond the combustible material. The webbing and the flaps together enclose an interior space and the combustible material. Pressure from the ignition of the combustible material causes the fluid seals to burst and the flaps to pivot outwardly crushing the gas-generating tablets in the housing.

20 Claims, 4 Drawing Sheets

TABLET-BREAKING INITIATOR FOR AIRBAG INFLATOR

BACKGROUND OF THE INVENTION

1. Field of the Invention

The present invention pertains to maintaining the safety of riders in highway vehicles. More particularly, the present invention pertains to the initiation of the inflation of passenger vehicle safety airbags that are intended to protect a rider from impact with the interior of the occupant enclosure of a vehicle.

2. Background

Inflatable safety restraint devices, or airbags, are mandated in most new highway vehicles. Airbags are typically included at least in the steering wheel and in the dashboard on the passenger side of a highway vehicle. In addition, such airbags are occasionally installed to inflate beside a vehicle occupant and provide side impact protection, to inflate in front of the legs and protect the knees from forward impact, or to inflate at other strategic locations within the occupant enclosure of a highway vehicle.

In the event of an accident, a collision sensor within the vehicle detects an impact situation and stimulates an inflator to produce pressurized gas. That pressurized gas is directed into an associated airbag, filling the cushion of the airbag, which then prevents any vehicle rider from impacting directly the interior surfaces of the occupant enclosure. The generation of compressed gas by the inflator is commenced through the electrical detonation of a small pyrotechnic initiator within the inflator. Inflatable airbags with associated inflators and initiators are usually manufactured together as passenger vehicle safety airbag modules, which are installed unit-wise at appropriate locations in vehicles.

A passenger-side, frontal-impact passenger vehicle safety airbag module is commonly installed behind the instrument panel of a vehicle at an airbag deployment window formed therethrough. A frontal-impact passenger vehicle safety airbag module is also commonly installed in the steering column for a vehicle to protect the driver. For both types of passenger vehicle safety airbag modules, the initiator in the inflator of the module is placed in electrical communication with the collision sensor of the vehicle, which may, for example, take the form of an accelerometer carried at a convenient location in the vehicle.

BRIEF SUMMARY OF THE INVENTION

A common type of gas generant is a solid explosive material that can be formed into tablets which, when broken and pulverized cause the explosive material to ignite and give rise to the development locally of a pulse of high combustion pressure and temperature. The subject invention utilizes such tablets in place of igniter materials or booster charges of the type that are commonly employed to start the production of pressurized inflation gas in the inflator of a passenger vehicle safety airbag module. The igniter for such an inflator is filled with tablets that ignite when broken or crushed. Nestled among these tablets is an initiator having a casing that is traversed by score marks, which permit the casing of the initiator to separate along those score marks and break into a plurality of pivotable flaps that open rapidly and forcefully into the surrounding tablets causing those tablets to disintegrate and ignite. To preclude the flaps from becoming potentially damage-causing, free-flying projectiles, each is secured at one end thereof inside the igniter. The igniter contains the blast produced by the disintegration of the tablets, but directs the elevated pressure and temperature of the blast into the inflator of the passenger vehicle safety airbag module, causing the production there of pressurized inflation gas to commence.

The present invention thus eliminates the need for a distinct igniter can assembly within the inflator of a passenger vehicle safety airbag module, saving assembly labor. Improved packaging results, which contributes to a reduction in the size, weight, and complexity of an inflator in which teachings of the present invention are embodied. The tablets employed in the inventive technology may be the same type as are used to generate pressurized inflation gas in an inflator. Accordingly, implementation of the present invention reduces the number of different types of materials required in such an inflator.

Thus according to one aspect of the present invention, a casing for an initiator in a passenger vehicle safety airbag module includes a tubular sidewall with opposed first and second end and a circular transverse cross section. The first end of the sidewall is securable about a squib for the initiator, whereby the sidewall between its second end and the squib circumscribes an interior space that is capable of housing combustible material that is ignitable by the squib. A substantially planar endwall is secured to the second end of the sidewall, closing the end of the sidewall opposite from the squib. A groove is formed in the side of the endwall and in the side of the sidewall opposite from the interior space. The groove traverses the endwall and extends there beyond in each direction along the sidewall toward the first end of the sidewall. Pressure from the ignition of the combustible material causes the endwall and the sidewall on opposite sides of the groove to burst along the groove and to pivot outwardly of the interior space about the first end of the sidewall.

In another aspect of the present invention, an initiator for an igniter in a passenger vehicle safety airbag module includes a squib that is remotely operable in the event of a vehicular collision, combustible material that can be ignited by the squib, and a cup-shaped casing having an open end that is secured about the squib. The squib and the casing thereby together enclose an interior space in which the combustible material is housed. The casing has a continuous sidewall with opposed first and second ends. The first end of the sidewall corresponds to the open end of the casing. An endwall is secured the second end of the sidewall, closing the end of the sidewall opposite from the squib. A network of frangible regions is formed in the casing. Individual of the frangible regions extend across the endwall between pairs of distinct locations on the first end of the sidewall. Pressure from the ignition of the combustible material causes the endwall and the sidewall on opposite sides of each of the frangible regions to burst along those frangible regions and to pivot outwardly of the interior space about the first end of the sidewall.

In one embodiment, the network includes a pair of elongated, interconnected frangible regions. These are each structurally-weakened portions of the sidewall and of the endwall of the casing. For example, theses structurally-weakened portions may be thinner that the portions of the sidewall and the endwall immediately adjacent thereto. Thus, one way in which to produce the frangible regions in the network is by scorings the face of sidewall and of the endwall of the casing opposite from the interior space. Where merely a pair of frangible regions are employed, the network would include an elongated first relatively thin region in the sidewall and in the endwall of the casing extending between distinct first and second locations on the first end of the side wall, in combination with a an elongated second relatively thin region in the sidewall and in the endwall of the casing extending between distinct third and fourth locations on the first end of the sidewall. The first and second relatively thin regions may cross each other on the endwall of the casing.

Also within the scope of the present invention is an igniter for a passenger vehicle safety airbag module. Such an igniter includes a housing with apertured walls, gas-generating tablets filling the housing, and an initiator in direct contact with gas-generating tablets in the housing. The initiator involves a squib remotely operable in the event of a vehicular collision, combustible material ignitable by the squib, a plurality of malleable flaps secured about the squib in an upstanding circumscribing array with spaced-apart lateral edges between adjacent of the flaps, and fluid seals interconnecting opposed edges of adjacent of the flaps in the array. The fluids seals may, by way of example, be interconnected regions of webbing extending between opposed edges of adjacent of the flaps in the array. Advantageously, the webbing and the flaps may be integrally formed from a single material.

Four flaps may be employed. The flaps may optionally be substantially identical in shape and size. The ends of the flaps remote from the squib curl radially inwardly into a spaced-apart edge-to-edge disposition beyond the combustible material. Together, the flaps and the seals enclose an interior space in which the combustible material is housed. The fluid seals are sufficiently structurally less robust than the flaps that pressure from the ignition of the combustible material causes the fluid seals to burst and the flaps to pivot outwardly crushing gas-generating tablets in the housing.

The present invention also includes methods for activating the inflator of a passenger vehicle safety airbag module. In one exemplary such method, an igniter casing is secured about a squib, a combustible material ignitable by the squib is installed in the igniter casing, and gas-generating tablets are assembled in direct contact with the exterior of the igniter casing. The igniter casing is subdivided into flaps, each of which is attached to the squib and each of which is individually outwardly pivotable therefrom by the ignition of the combustible material into pulverizing impacts with the gas-generating tablets. This may be accomplished by scoring the exterior of the igniter casing with a plurality of intersecting groves. The igniter is operated, and energy from the pulverizing impacts with the gas-generating tablets is directed into the inflator for the airbag module. To do so, the igniter casing and the gas-generating tablets are enclosed in a housing with apertured walls, and the housing is placed in fluid communication with the inflator for the airbag module.

BRIEF DESCRIPTION OF THE SEVERAL VIEWS OF THE DRAWINGS

In order that the manner in which the above-recited and other features and advantages of the present invention are obtained will be readily understood, a more particular description of the present invention briefly described above will be rendered by reference to specific embodiments thereof which are illustrated in the appended drawings. Understanding that these drawings depict only typical embodiments of the present invention and are not therefore to be considered to be limiting of scope thereof, the present invention will be described and explained with additional specificity and detail through the use of the accompanying drawings in which.

DETAILED DESCRIPTION OF THE INVENTION

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the present invention, as represented in FIGS. 1-6D, is not intended to limit the scope of the invention, as claimed, but is merely representative of selected embodiments of the invention.

In this application, the phrases "connected to", "coupled to", and "in communication with" refer to any form of interaction between two or more entities, including mechanical, electrical, magnetic, electromagnetic, pneumatic, and thermal interactions.

The phrases "attached to", "secured to", and "mounted to" refer to a form of mechanical coupling that restricts relative translation or rotation between the attached, secured, or mounted object, respectively. The phrases "pivotally attached to" and "slidably attached to" refer to forms of mechanical coupling that permit relative rotation or relative translation, respectively, while restricting other relative motions. The phrase "attached directly to" refers to a form of securement in which the secured items are in direct contact and retained in that state of securement without resort to fasteners or adhesives.

The term "abutting" refers to items that are in direct physical contact with each other, although the items may not be attached together. The term "grip" refers to items that are in direct physical contact with one of the items firmly holding the other. The term "integrally formed" refers to a body that is manufactured as a single piece, without requiring the assembly of constituent elements. Multiple elements may be integrally formed with each other, when developed attached directly to each other from a single work piece. Thus, elements that are "coupled to" each other may be formed together as a single piece.

Figure 1:
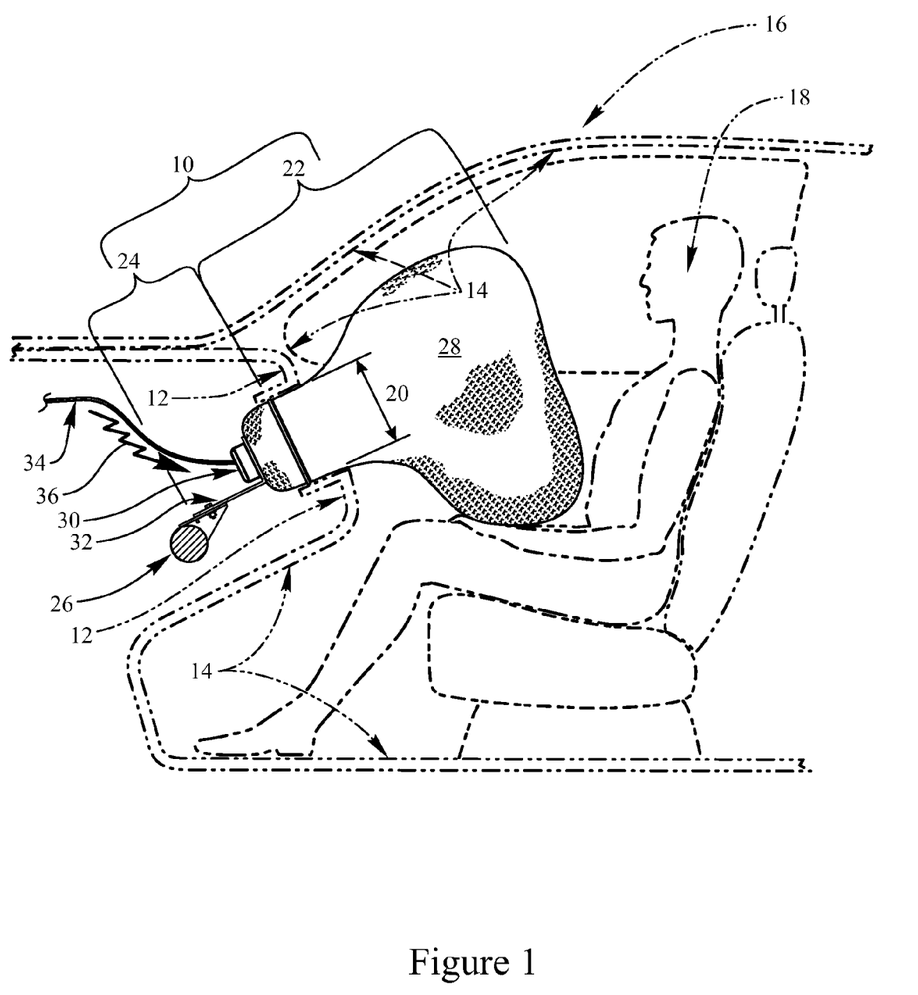
FIG. 1 is a side elevation view of a passenger vehicle safety airbag module incorporating teachings of the present invention mounted as a passenger-side, frontal-impact protection feature on the instrument panel of a highway vehicle and deployed into the occupant enclosure with the cushion of the airbag in an inflated condition.

FIG. 1 is a side elevation view of an embodiment of a passenger vehicle safety airbag module 10 incorporating teachings of the present invention and mounted as a passenger-side, frontal-impact protection feature at the instrument panel 12 of the occupant enclosure 14 of a highway vehicle 16. Airbag module 10 provides protection to a rider 18 seated within occupant enclosure 14 by precluding, for example, the head or legs of rider 18 from impacting the interior of occupant enclosure 14 during a collision involving vehicle 16. It should be understood, however, that the teachings of the present invention have applicability, not only to passenger-side, frontal-impact protection, but also to other forms of passenger protection, such as knee bolsters, driver-side airbags, overhead airbags, inflatable curtains, side airbags, inflatable structural stiffeners, and the like. Consequently, although a passenger-side airbag is disclosed and described herein, the term "passenger vehicle safety airbag" includes these other forms of passenger protection. Furthermore, the teachings of the present invention may be employed advantageously, not only in highway vehicles, but also in vehicles that travel over rails, from cables, on water, and through air or space.

Airbag module 10 is installed in vehicle 16 at an airbag deployment window 20 formed through instrument panel 12. As shown by way of example and not limitation, airbag module 10 in FIG. 1 is mounted outside of occupant enclosure 14 in proximity to deployment window 20. Alternatively, an airbag module, such as airbag module 10, may be installed in a mounting recess formed in a side of occupant enclosure 14 that faces rider 18. In such instances, the mouth of the mounting recess also faces rider 18 and functions as an airbag deployment window in the same manner as deployment window 20.

By way of overview, airbag module 10 includes a deployment section 22 that is secured to instrument panel 12 at deployment window 20 and an energizer section 24 that is supported independently from deployment section 22 on a structural element 26 of vehicle 16. Deployment section 22 includes a gas-inflatable, impact-absorbing cushion 28.

Energizer section 24 of airbag module 10 is in inflation communication with deployment section 22. Energizer section 24 generates and delivers pressurized gas to deployment section 22, when an impact is imminent between rider 18 and occupant enclosure 14. Toward that end, energizer section 24 includes an inflator 30 that produces the pressurized gas for cushion 28 and a mounting bracket 32 secured to inflator 30 by which inflator 30 is supported from structural element 26 of vehicle 16. Inflator 30 may be, for example, a compressed gas inflator, a pyrotechnic inflator, a hybrid inflator, or any other type of device that generates pressurized gas with extreme dispatch. The activation of inflator 30 is triggered electrically, but indirectly, by way of a pyrotechnic initiator that is not visible in FIG. 1, but that will be present in the balance of the accompanying figures.

An electrical wire 34 is coupled between the initiator of inflator 30 and the collision sensor for vehicle 16. When an impact involving vehicle 16 is occurring or is about to occur, the collision sensor generates an activation signal 36 that is transmitted along electrical wire 34 to trigger activity in inflator 30. Inflator 30 then produces an abundance of compressed gas that is communicated into deployment section 22 of airbag module 10, filling cushion 28 to capacity and causing cushion 28 to extend through deployment window 20 into occupant enclosure 14 intermediate rider 18 and instrument panel 12 as shown.

Figure 2:
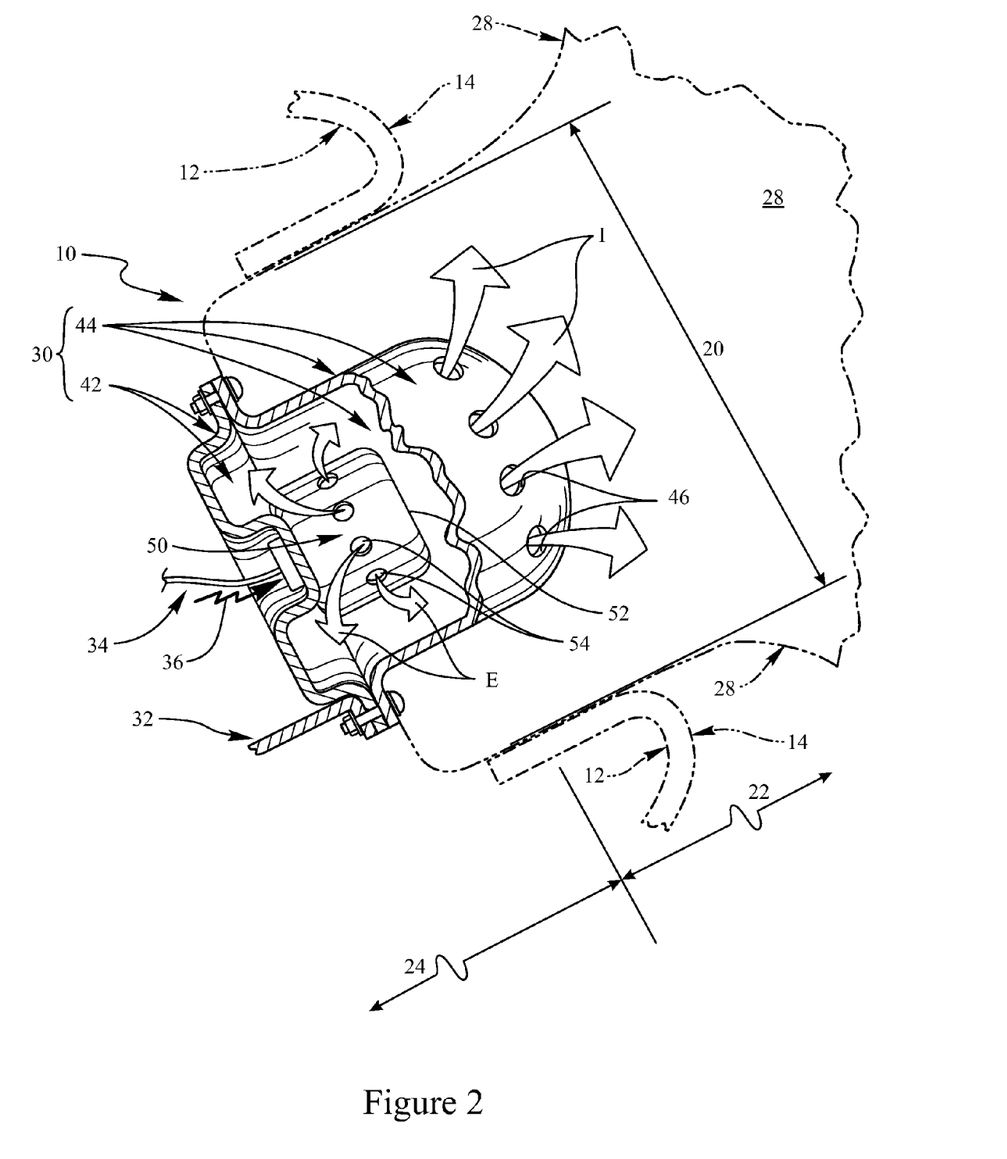
FIG. 2 is a view in partial cross section of the inflator of the passenger vehicle safety airbag module of FIG. 1 revealing therewithin an embodiment of an igniter incorporating teachings of the present invention.

FIG. 2 is a view in partial cross section of an example of an energizer section 24 of airbag module 10 from FIG. 1. Inflator 30 of energizer section 24 incorporates teachings of the present invention and is supported by mounting bracket 32 in the vicinity of deployment window 20, while deployment section 22 of airbag module 10 is attached to instrument panel 12 within deployment window 20. Compressed inflation gas is produced in inflator 30 is communicated from inflator 30 to deployment section 22 of airbag module 10, filling cushion 28 thereof, which projects through deployment window 20 into the interior of occupant enclosure 14. The mounting and support of the sections of a passenger vehicle safety airbag module, such as airbag module 10, in relation to the occupant enclosure of a vehicle can vary from the specific details depicted in FIG. 2 without departing from the principles of the present invention.

By way of example, inflator 30 includes a sturdy base 42 and, joined thereto, a correspondingly sturdy dome 44 through which are formed a plurality of apertures 46. Inflation gas I emerges from inflator 30 through apertures 46 to fill cushion 28. Whether inflator 30 is a compressed gas inflator, a pyrotechnic inflator, a hybrid inflator, or any other type of device that generates pressurized gas with extreme dispatch, the production of inflation gas I is not stimulated directly by activation signal 36 on electrical wire 34. Instead, the activity of inflator 30 in producing inflation gas I is commenced by an igniter 50 that is secured within base 42 and dome 44 of inflator 30. Igniter 50 is the element of airbag module 10 that is directly controlled by activation signal 36.

Igniter 50 embodies teachings of the present invention and includes a relatively robust housing 52 having a plurality of apertures 54 that place the interior of housing 52 in fluid communication with the interior of inflator 30. Typically, pyrotechnic reactions within housing 52 of igniter 50 give rise to a pulse of high pressure and temperature that is depicted schematically in FIG. 2 by arrows as ignition energy E. Ignition energy E emerges from igniter 50 through apertures 54 to stimulate gas-generating activity within inflator 30. The manner by which an igniter, such as igniter 50, is assembled with other elements of an inflator in a passenger vehicle safety airbag module can vary from that depicted in FIG. 2 without departing from teachings of the present invention.

Figure 3:
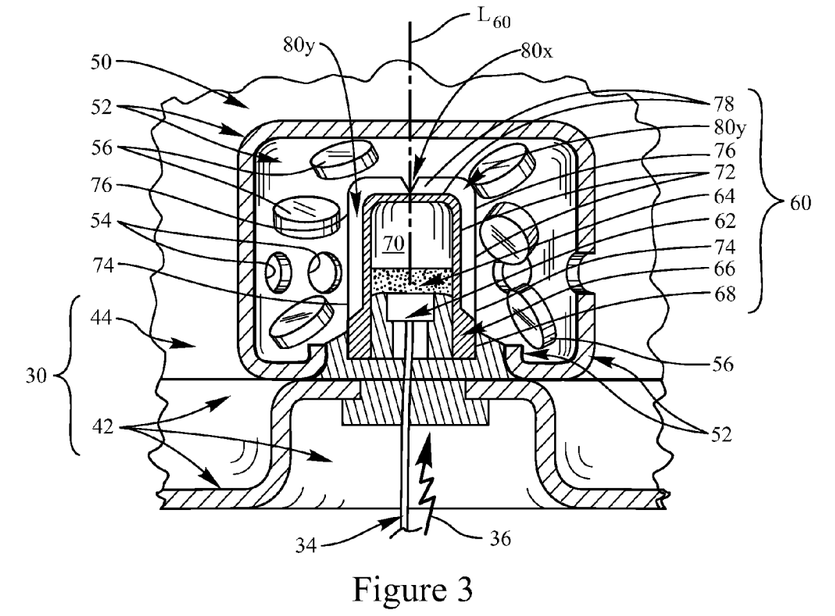
FIG. 3 is a cross-sectional view of the igniter of FIG. 2 revealing therewithin an embodiment of an initiator incorporating teachings of the present invention.

FIG. 3 is a cross-sectional view of an igniter 50. Housing 52 of igniter 50 encloses a plurality of gas generating tablets 56. Tablets 56 surround and directly contact the exterior of a pyrotechnic initiator 60 having a longitudinal axis $L_{60}$ about which the structure of initiator 60 is substantially radially symmetric. The housing 52 illustrated in FIG. 3 is shown as closed at the longitudinal axis $L_{60}$, however, there may be an opening at or near the longitudinal axis $L_{60}$ to facilitate loading of the generant tablets 56 into the housing 52. Initiator 60 is connected directly to electrical wire 34. Tablets 56 are of a type made up of an energetic material that ignites when the tablets are crushed or pulverized. The ignition of the energetic material of tablets 56 in turn generates gas at high pressures and temperatures. The mechanical degradation of tablets 56 thus produces ignition energy E shown in FIG. 2 that is communicated through apertures 54 into inflator 30.

The crushing or pulverization of tablet 56 is effected by initiator 60. Initiator 60 includes an electrically activatable squib 62, such as an electrical heating element, and a quantity of a combustible material 64 that is ignitable by squib 62 when activation signal 36 reaches squib 62 on electrical wire 34. Initiator 60 also includes a cup-shaped casing 66 having an open end 68 that is secured about squib 62. Squib 62 and casing 66 thereby together enclose an interior space 70 in which combustible material 64 is housed.

Figure 4:
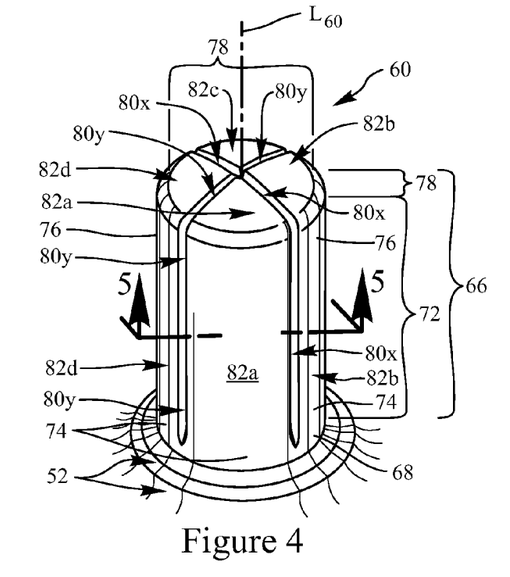
FIG. 4 is a perspective view of the exterior of the initiator of FIG. 3 rotated about the longitudinal axis of the initiator in a counter clockwise direction by about 45 degrees from the view presented in FIG. 3.
Figure 5:
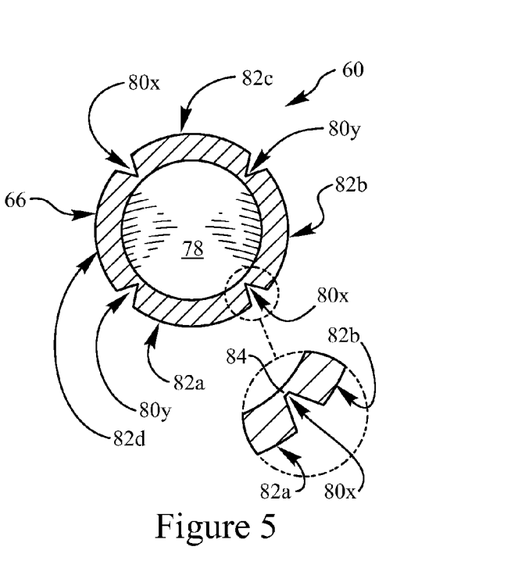
FIG. 5 is a transverse cross-sectional view of the initiator of FIG. 4 taken along section line 5-5 therein.

The structure of casing 66 will be explored by reference to the views thereof contained not only in FIG. 3, but also in FIGS. 4 and 5. FIG. 4 is a perspective view of the exterior of casing 66 of initiator 60 rotated about longitudinal axis $L_{60}$ of initiator 60 in a counter clockwise direction by about 45 degrees from the view thereof presented in FIG. 3. FIG. 5 is a transverse cross-sectional view of initiator 60 taken along section line 5-5 in FIG. 4.

Casing 66 includes a continuous tubular sidewall 72 of circular transverse cross section having a first end 74 and opposite therefrom a second end 76. First end 74 of sidewall 72 corresponds to open end 68 of casing 66. A substantially planar endwall 78 is secured to second end 76 of sidewall 72 closing the end of interior space 70 remote from open end 68 of casing 66. According to one aspect of the present invention, a network of frangible regions is formed in the outer surface of casing 66, the faces of sidewall 72 and endwall 78 remote from interior space 70. Individual of the frangible regions extend across endwall 78 between pairs of distinct locations on first end 74 of sidewall 78. The frangible regions of the network are structurally-weakened portions of sidewall 72 and endwall 78. These frangible regions may, for example, be thinner than the adjacent portions of sidewall 72 and endwall 78 on either side thereof.

Thus, as shown by way of example and not limitation in FIGS. 3 and 4, casing 66 includes a network of scorings formed in the outer surface of sidewall 72 and endwall 78. Each of the scorings of the network of frangible regions crosses endwall 78 and extends in both directions therefrom to distinct locations at first end 74 of sidewall 72. A pair of distinct scorings 80x and 80y are identified in FIGS. 3, 4 and 5. A portion of scoring 80x visible in FIG. 4 extends in the longitudinal direction along sidewall 72 of casing 66 from first end 74 of sidewall 72 to second end 76 and there beyond diametrically across endwall 78 of casing 66. While not visible in FIG. 4, scoring 80x continues therefrom in the longitudinal direction along sidewall 72 from second end 76 thereof toward first end 74 thereof. This latter portion of scoring 80x is not visible in FIG. 4, but is shown in the cross section of FIG. 5. Similarly, A portion of scoring 80y visible in FIG. 4 extends longitudinally along sidewall 72 from first end 74 thereof to second end 76 and therefrom diametrically across endwall 78 of casing 66. While the remainder of scoring 80y is not visible in FIG. 4, scoring 80y continues therefrom longitudinally along sidewall 72 from second end 76 to first end 74 thereof, as is apparent in the cross section of FIG. 5. Scoring 80x and scoring 80y cross each other centrally of endwall 78 in a generally orthogonal manner.

The details of the network of frangible regions depicted in FIGS. 4 and 5 are provided by way of example only. More than a pair of scorings, such as scorings 80x and 80y, may be provided in such a network of frangible regions, and the portions of the scorings extending along sidewall 72 may be parallel neither to each other nor to longitudinal axis $L_{60}$ of initiator 60. The crossing point of such scorings on endwall 78 may be offset from the center thereof, and all or any portion of individual of the scorings in the network may be curved or jagged, rather than linear as depicted in FIG. 4.

The network of scorings is thus a network of regions of casing 60 that are likely to fail mechanically in advance of other portions of casing 60, when casing 60 is exposed to mechanical stress. Typically a casing, such as casing 66, is fabricated from a malleable metal. Thus, the network of scorings 80x, 80y separates sidewall 72 and endwall 78 of casing 66 into a plurality of four (4) malleable flaps 82a, 82b, 82c, 82d that are secured about squib 62 in an upstanding circumscribing array with spaced apart lateral edges between adjacent of flaps 82a, 82b, 82c and 82d. The ends of flaps 82a, 82b, 82c and 82d remote from squib 62 curl radially inwardly into a spaced-apart, edge-to-edge disposition beyond combustible material 64. As shown by way of example in the inset in FIG. 5, thin, membranous fluid seals 84 that are structurally less robust than flaps 82a, 82b, 82c and 82d interconnect opposed edges of adjacent of flaps 82a, 82b, 82c and 82d. Flaps 82a, 82b, 82c and 82d and the seals 84 nonetheless together enclose interior space 70. Pressure developed within casing 66 from the ignition of combustible material 64 will cause seals 84 to burst, splitting casing 66 apart along scorings 80x, 80y. This releases flaps 82a, 82b, 82c and 82d to pivot violently outwardly about squib 62 impacting and crushing tablets 56 within housing 52. A pulse of high pressure and temperature is thereby produced in housing 52, and this is communicated through apertures 54 to inflator 30, stimulating inflator 30 to commence the production of pressurized inflation gas I shown in FIG. 2.

Stages in the operation of an initiator, such as initiator 60 from FIGS. 3-5, is presented in FIGS. 6A-6D.

Figure 6A:
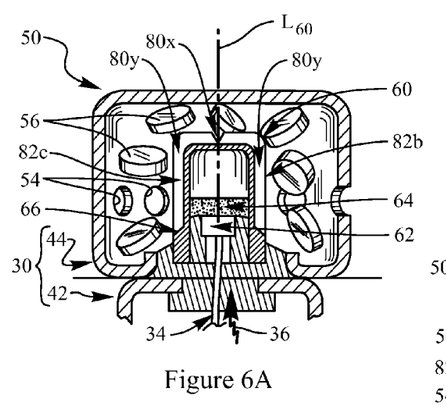
FIGS. 6A-6D form a timed sequence of diagrams that illustrate stages in the operation of the initiator of FIGS. 3-5.
Figure 6B:
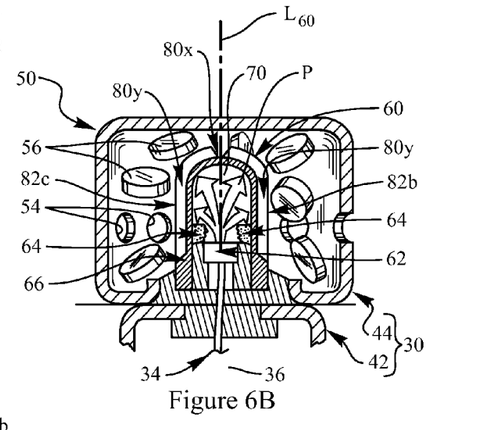
Figure 6C:
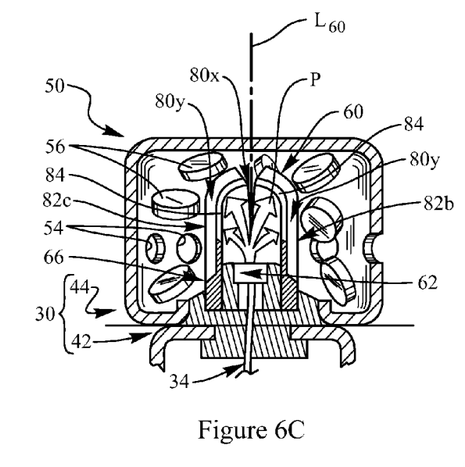
Figure 6D:
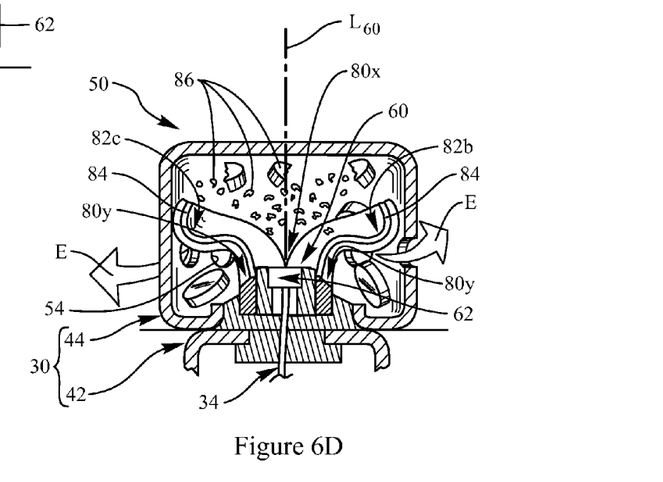

In FIG. 6A tablets 56 fill housing 52 of igniter 50 and directly contact the exterior of casing 66 of initiator 60. Activation signal 36 is received on electrical wire 34 at squib 62 of initiator 60. Squib 62 undergoes electrical resistive heating, and combustible material 64 is ignited, as illustrated in FIG. 6B. The ignition of combustible material 64 results in the development of an internal pressure P within casing 66. Endwall 78 thereof bulges upwardly, away from squib 62, forming a dome. Internal pressure P being otherwise unrelieved, sidewall 72 and endwall 78 on opposite sides of individual of the scorings in the network of frangible regions in casing 66 burst along scorings 80x, 80y by tearing seals 84. As a result, casing 66 separates into a plurality of four flaps attached about squib 62, although in FIG. 6C only flaps 82b, 82c can be seen. Internal pressure P causes flaps 82b, 82c to pivot outwardly from interior space 70 and squib 62 toward housing 52 of igniter 50. Flaps 82b, 82c impact, crush, and pulverize tablets 56 into a spontaneously-combustible powder 86. Powder 86 ignites. Ignition energy E develops within igniter 50 and is communicated through apertures 54 in housing 52 into inflator 30. There the production of pressurized inflation gas I ensues.

The present invention also includes methods for activating the inflator of a passenger vehicle safety air bag module.

In one exemplary embodiment of such a method, an igniter casing is secured about a squib, and a combustible material ignitable by the squib is installed in the igniter casing. Gas generating tablets are assembled in direct contact with the exterior of the igniter casing. The igniter casing is subdivided into a plurality of flaps that are each attached to the squib, but each of which is individually outwardly pivotable from the squib into pulverizing impacts with the gas generating tablets by the ignition of the combustible material in the casing. The subdividing of igniter casing into flaps may involve scoring the exterior of the igniter casing with a plurality of intersecting grooves. The igniter is operated, and energy from the pulverizing impacts with the gas-generating tablets is directed into the inflator for the passenger vehicle safety airbag module. This involves enclosing the igniter casing and the gas generating tablets in a housing with aperture walls and placing the housing in fluid communication with the inflator of the passenger vehicle safety airbag module.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within the scope thereof.

What is claimed is:

1. An inflator assembly for a passenger vehicle safety airbag module comprising:
   an initiator with a housing and gas-generating tablets disposed within the housing, the gas-generating tablets being crushable into combustible powder, the initiator further comprising a casing assembly disposed within the housing with the gas-generating tablets being external to the casing assembly, the casing assembly having a pre-deployment mode and a deploying mode, the casing assembly comprising:
  (a) a tubular sidewall having opposed first and second ends while in the pre-deployment mode, the first end of the sidewall being secured about a squib, the sidewall between the second end thereof and the squib circumscribes an interior space for housing a combustible material ignitable by the squib;
  (b) an endwall secured to and closing the second end of the sidewall; and
  (c) a groove traversing the endwall and extending beyond the endwall along the sidewall toward the first end thereof, upon activation of the squib the casing assembly transitions from the pre-deployment mode to the deploying mode as pressure from the ignition of the combustible material causes the endwall and the sidewall on opposite sides of the groove to burst therealong creating flaps that pivot outwardly of the interior space about the first end of the sidewall to impact and crush at least a portion of the gas-generating tablets into combustible powder that combusts as a result of the impact.

2. An inflator assembly as recited in claim 1, wherein the groove is formed in the face of the endwall opposite from the interior space and in the face of the sidewall opposite from the interior space.

3. An inflator assembly as recited in claim 1, wherein the sidewall has a circular transverse cross section.

4. An inflator assembly as recited in claim 1, wherein the endwall is substantially planar.

5. An igniter assembly for a passenger vehicle safety airbag module comprising:
  an initiator having a pre-deployment mode and a deploying mode;
  a plurality of gas-generating tablets disposed about the initiator, the gas-generating tablets being crushable into combustible powder; and
  wherein the initiator comprises:
    (a) a squib remotely operable in the event of a vehicular collision;
    (b) combustible material ignitable by the squib;
    (c) a cup-shaped casing having an open end secured about the squib, the squib and the casing thereby together enclosing an interior space wherein the combustible material is housed while in the pre-deployment mode, the casing comprising:
      (i) a continuous sidewall having opposed first and second ends, the first end of the sidewall corresponding to the open end of the casing; and
      (ii) an endwall secured to and closing the second end of the sidewall; and
    (d) a network of frangible regions formed in the casing, individual of the frangible regions extending across the endwall and along the sidewall, upon activation of the squib the initiator transitions from the pre-deployment mode to the deploying mode as pressure from the ignition of the combustible material causes the endwall and the sidewall on opposite sides of each of the frangible regions to burst therealong creating flaps that pivot outwardly of the interior space about the first end of the sidewall to impact and crush at least a portion of the gas-generating tablets into combustible powder that combusts as a result of the impact.

6. An igniter assembly as recited in claim 5, wherein the frangible regions of the network are interconnected.

7. An igniter assembly as recited in claim 5, wherein the frangible regions of the network comprise structurally-weakened portions of the sidewall and of the endwall of the casing.

8. An igniter assembly as recited in claim 7, wherein the structurally-weakened portions of the sidewall and of the endwall of the casing are thinner that the portions of the sidewall and the portions of the endwall adjacent thereto.

9. An igniter assembly as recited in claim 8, wherein the network comprises scorings on the face of the casing opposite from the interior space.

10. An igniter assembly as recited in claim 5, wherein the network comprises:
  (e) an elongated first relatively thin region in the casing that extends from a first location on the sidewall proximate the first end of the sidewall across the endwall and along the sidewall to a second location on the sidewall distinct from the first location and proximate the first end of the sidewall; and
  (f) an elongated second relatively thin region in the casing that extends from a third location on the sidewall proximate the first end of the sidewall across the endwall and along the sidewall to a fourth location on the sidewall distinct from the third location and proximate the first end of the sidewall.

11. An igniter assembly as recited in claim 10, wherein the first and second relatively thin regions cross on the endwall of the casing.

12. An igniter for a passenger vehicle safety airbag module, the igniter comprising:
  (a) a housing with apertured walls;
  (b) gas-generating tablets disposed within the housing, the gas-generating tablets being crushable into combustible powder;
  (c) an initiator in direct contact with gas-generating tablets in the housing, the initiator having a pre-deployment mode and a deploying mode and comprising:
    (i) a squib remotely operable in the event of a vehicular collision;
    (ii) combustible material ignitable by the squib;
    (iii) a casing comprising a plurality of malleable flap-like sections secured about the squib in an upstanding circumscribing array with spaced-apart lateral edges between adjacent of the flap-like sections, the ends of the flaps remote from the squib curling radially inwardly into a spaced-apart edge-to-edge disposition beyond the combustible material when the initiator is in the pre-deployment mode; and
    (iv) fluid seals interconnecting opposed edges of adjacent of the flap-like sections of the casing, the flap-like sections and the seals thereby together enclosing an interior space wherein the combustible material is housed when the initiator is in the pre-deployment mode, the fluid seals being sufficiently structurally less robust than the flap-like sections that upon activation of the squib the initiator transitions from the pre-deployment mode to the deployed mode as pressure from the ignition of the combustible material causes the fluid seals to burst creating flaps to pivot outwardly to impact and crush at least a portion of the gas-generating tablets within the housing into combustible powder that combusts as a result of the impact.

13. An initiator as recited in claim 12, wherein the fluid seals are interconnected.

14. An initiator as recited in claim 12, wherein the fluids seals comprise regions of webbing extending between opposed edges of adjacent of the flap-like sections.

15. An initiator as recited in claim 14, wherein the webbing and the flap-like sections are integrally formed from a single material.

16. An initiator as recited in claim 12, wherein the flap-like sections are substantially identical in shape and size.

17. An initiator as recited in claim 12, wherein the plurality of flap-like sections comprises four flap-like sections.

18. An inflator module of a passenger vehicle safety airbag module having an inflatable airbag, comprising:
   an igniter having a casing disposed about a squib and combustible material ignitable by the squib, the casing being subdivided into flap-like sections, each flap-like section being attached to the squib and being individually separated into flaps that are outwardly pivotable by the ignition of the combustible material; and
   gas-generating tablets in direct contact with the exterior of the casing, the gas-generating tablets combust when receiving pulverizing impacts from the flaps of the casing of the igniter.

19. An inflator module as recited in claim 18, wherein the flap-like sections are defined by scoring on the exterior of the casing forming a plurality of intersecting grooves.

20. An inflator module as recited in claim 18, further comprising a housing with apertured walls that encloses the casing and the gas-generating tablets, the apertured walls provide fluid communication of the inflation gas from the interior of the housing to the inflatable airbag.

\* \* \* \* \*